(12) United States Patent
Naske

(10) Patent No.: US 9,615,075 B2
(45) Date of Patent: Apr. 4, 2017

(54) METHOD AND DEVICE FOR STEREO BASE EXTENSION OF STEREOSCOPIC IMAGES AND IMAGE SEQUENCES

(75) Inventor: Rolf-Dieter Naske, Kakenstorf (DE)

(73) Assignee: STERRIX TECHNOLOGIES UG, Kakenstorf (DE)

( * ) Notice: Subject to any disclaimer, the term of this patent is extended or adjusted under 35 U.S.C. 154(b) by 649 days.

(21) Appl. No.: 13/979,557

(22) PCT Filed: Jan. 17, 2012

(86) PCT No.: PCT/DE2012/000042
§ 371 (c)(1),
(2), (4) Date: Jul. 30, 2014

(87) PCT Pub. No.: WO2012/097802
PCT Pub. Date: Jul. 26, 2012

(65) Prior Publication Data
US 2014/0347444 A1    Nov. 27, 2014

(30) Foreign Application Priority Data
Jan. 19, 2011  (DE) .................. 10 2011 008 886

(51) Int. Cl.
*H04N 13/00* (2006.01)
*H04N 13/02* (2006.01)
(52) U.S. Cl.
CPC ..... *H04N 13/0018* (2013.01); *H04N 13/0011* (2013.01); *H04N 13/0271* (2013.01); *H04N 2013/0081* (2013.01)
(58) Field of Classification Search
CPC ........... H04N 13/0011; H04N 13/0018; H04N 13/0271; H04N 2013/0081
See application file for complete search history.

(56) References Cited

U.S. PATENT DOCUMENTS 5,530,774 A * 6/1996 Fogel .................. G06K 9/20
348/50

FOREIGN PATENT DOCUMENTS

WO    WO 2007/121970    11/2007

OTHER PUBLICATIONS

Huang H-C et al: "Generation of Multiviewpoint Video From Stereoscopic Video", IEEE Transactions on Consumer Electronics, IEEE Service Center, New York, NY, US,vol. 45, No. 1, Feb. 1, 1999 (Feb. 1, 1999), pp. 124-134, XP000888364, ISSN: 0098-3063, DOI: 10.1109/30.754427; p. 126-130; figures 10,11.

(Continued)

*Primary Examiner* — Andy Rao
*Assistant Examiner* — Tyler Edwards
(74) *Attorney, Agent, or Firm* — Maschoff Brennan

(57) ABSTRACT

The invention relates to a method and a device for improving the depth impression of stereoscopic images and image sequences. In autostereoscopic multi-viewer display devices, generally a plurality of intermediate perspectives are generated, which lead to a reduced stereo base upon perception by the viewers. The stereo base widening presented in this application leads to a significant improvement and thus to a more realistic depth impression. It can either be effected during recording in the camera or be integrated into a display device. The improvement in the depth impression is achieved by the generation of synthetic perspectives situated, in the viewing direction of the camera lenses, on the left and right of the extreme left and extreme right recorded camera perspective on the right and left lengthening of the connection line formed by the extreme left and extreme right camera perspectives. These synthetic perspectives are calculated only on the basis of a disparity map, which is supplied or which is calculated in a preprocessing step. In this case, the method presented solves the following prob- (Continued)

lems: 1. Calculation of the new extension perspectives, 2. Correct repositioning of the camera perspectives supplied within the visual zones, 3. Definition of which disparities are intended to be continued in the case of collision in the extension and 4. Interpolation of the image regions which become visible as a result of the extension of the stereo base. In this case, instances of left and right masking are also identified and optically correctly maintained and supplemented in the extension perspectives.

6 Claims, 15 Drawing Sheets

(56) References Cited

OTHER PUBLICATIONS

Manuel Lang et al: "Nonlinear disparity mapping for stereoscopic 3D", ACM Transactions on Graphics, vol. 29, No. 4, Jul. 26, 2010 (Jul. 26, 2010), p. 1, XP55016814, ISSN: 0730-0301, DOI: 10.1145/1778765.1778812 Section "Display Adaptation"; p. 75:7, right-hand column; figure 11.

Humera Noor: "Chapter 3: View Synthesis using Image Extrapolation", Intelligent View Extrapolation for Dynamic Scenes, PHD Thesis, Jan. 1, 2008 (Jan. 1, 2008), pp. 39-71, XP55036131, Karachi, Pakistan Retrieved from the Internet: URL:http://prr.hec.gov.pk/Thesis/19S.pdf [retrieved on Aug. 22, 2012] p. 48-63; figures 3.1, 3.2.

\* cited by examiner

METHOD AND DEVICE FOR STEREO BASE EXTENSION OF STEREOSCOPIC IMAGES AND IMAGE SEQUENCES

The invention relates to a method and a device for improving the depth impression of stereoscopic images and image sequences. The improvement can either be effected during recording in the stereo camera or be integrated into a stereoscopic display device.

As early as 1931, Lüscher [1] published an article presenting the basic rules of stereoscopy. The first rule he outlined (a) states that the left and right subimage of a stereo image have to use the same viewing angle difference, meaning that the stereo base has to be in the range of 65 mm.

Because of technical or design reasons this rule is occasionally violated by stereoscopic cameras or video recorders. In such case, an adaptation can be made through the stereo base extension described herein.

If this lens distance condition has been kept during capturing, it will be preserved for 3D glasses-based or autostereoscopic single user display devices, creating a good depth impression.

But for autostereoscopic multi-user display devices in general, a number of in-between perspectives are generated, which lead to a narrowed stereo base during observation by viewers. This violates Lüscher's basic rule that "during observation the same viewing angle (stereo base) as during capturing should be used". Even in this case the stereo base extension presented here can lead to a significant improvement, meaning more realistic depth impression.

In the following the stereo base extension will first, but without limitation of universal validity, be described for an autostereoscopic multi-user display device, and afterwards exemplarily for a stereoscopic recording device. As the principles are identical for both cases, this is valid.

PROBLEM DESCRIPTION

For 3D glasses-based display devices the stereo image captured by a stereo camera with generally two lenses is transferred to the viewer's left and right eye respectively by polarization or shutter glasses. If several viewers are using 3D glasses they will all perceive a good 3D impression. Here, the perceived eye distance is identical to the distance of the two camera lenses. In general, this is in the range of 65 mm to retain the naturalness of the spacial impression.

For autostereoscopic single viewer displays there exists exactly one single optimal viewing position, from which only one single viewer can have an optimal depth impression. Some autostereoscopic single-viewer displays allow increasing movability by tracking the viewer's eye position using so-called 'head tracking systems', and are able to adapt the presented stereo image to the actual position of the viewer.

In [2] for the first time a system was described which was able to observe and track several viewers at the same time.

All systems have in common that only two camera perspectives are necessary to generate an optimal depth impression for the viewer.

But for usage in a living room or public building this approach is not viable. Multiple viewers—generally as many as possible—should be able to perceive an optimal depth impression simultaneously and without their movement being restricted.

This is achieved with currently existing autostereoscopic multi-user display devices by synthesizing a certain number of in-between perspectives between the captured camera perspectives and using them to generate a set of viewing zones in front of the display device. Within each of the viewing zones one or more viewers can freely move around and perceive a depth impression.

Depending on the optical system used these viewing zones have a specific viewing zone width. If a viewer is at the left border of a viewing zone, his/her left eye will see the left captured camera perspective. If the viewer is at the right border of a viewing zone his/her right eye will see the right captured camera perspective. Usually the width of a viewing zone ranges between 300 and 600 mm. If the viewer is moving from one viewing zone to another for a short period this will result in a fuzzy spatial image.

But because the viewing zone is significantly wider than the eye distance (usually about 65 mm) it's obvious that at the left border the right eye sees a perspective which is much closer to the left captured camera perspective than to the right captured camera perspective. This leads to the effect that the perceived eye distance is significantly smaller than the captured camera distance, meaning the distance of the two camera lenses. The result is a significant reduction of the depth impression for an autostereoscopic multi-user display device. The wider the viewing zone the stronger this effect is. On the other hand, the viewing zone should be as wide as possible to maximize freedom of motion for the viewer.

The reduction of the depth impression is an essential disadvantage of such display devices and needs to be minimized, and in certain cases it can be eliminated by the patent application presented here.

This is achieved by the generation of virtual perspectives which are positioned left of the left-most captured camera perspective and right of the right-most captured camera perspective looking in the same viewing direction as the camera lenses, as documented in claim 1. Hereinafter it is referred to as stereo base extension, as the connecting line between the left-most and right-most captured camera perspective defines the stereo base, and the synthesized virtual perspectives are located on the extension of this captured stereo base.

Furthermore, a device will be disclosed consisting of at least one processing unit and at least one storage device executing the methods described here.

STATE OF THE ART

Until today stereo base extensions have only been described in the field of acoustics. In that field various literatures have been published, but these cannot be transferred to the problem statement described here.

In [3] a method is described for generating a multitude of perspectives right and left of the fed 2D image starting from a fed 2D image and a depth map. Based on the procedure described there, a 2D image is deformed using the fed depth map. But this will not result in optically correct perspectives because the information about left and right occlusions is missing. For the method described here a stereo image with two or more perspectives is absolutely necessary. Only this way can occlusions be integrated optically correct into the various synthetic perspectives.

On the other hand, there are numerous well-known methods for generating perspectives between a fed left and right camera perspective. References are for example published in [4] or [5].

All these methods do not refer to the subject of the patent application presented here as it is not their purpose to generate additional perspectives outside the stereo base. Moreover, these methods cannot be modified in a desirable way.

But even extrapolating deformation methods, as described in [7] for example, cannot be used to solve the stated problem, as they are not able to preserve and complement the geometric properties of the scene with optically correctness.

DESCRIPTION OF THE DRAWINGS

LE5: Left extension perspective 5
RE1: Right extension perspective 1
RE2: Right extension perspective 2
RE3: Right extension perspective 3
RE4: Right extension perspective 4
RE5: Right extension perspective 5

DESCRIPTION OF THE USED ABBREVIATIONS

Figure 1:
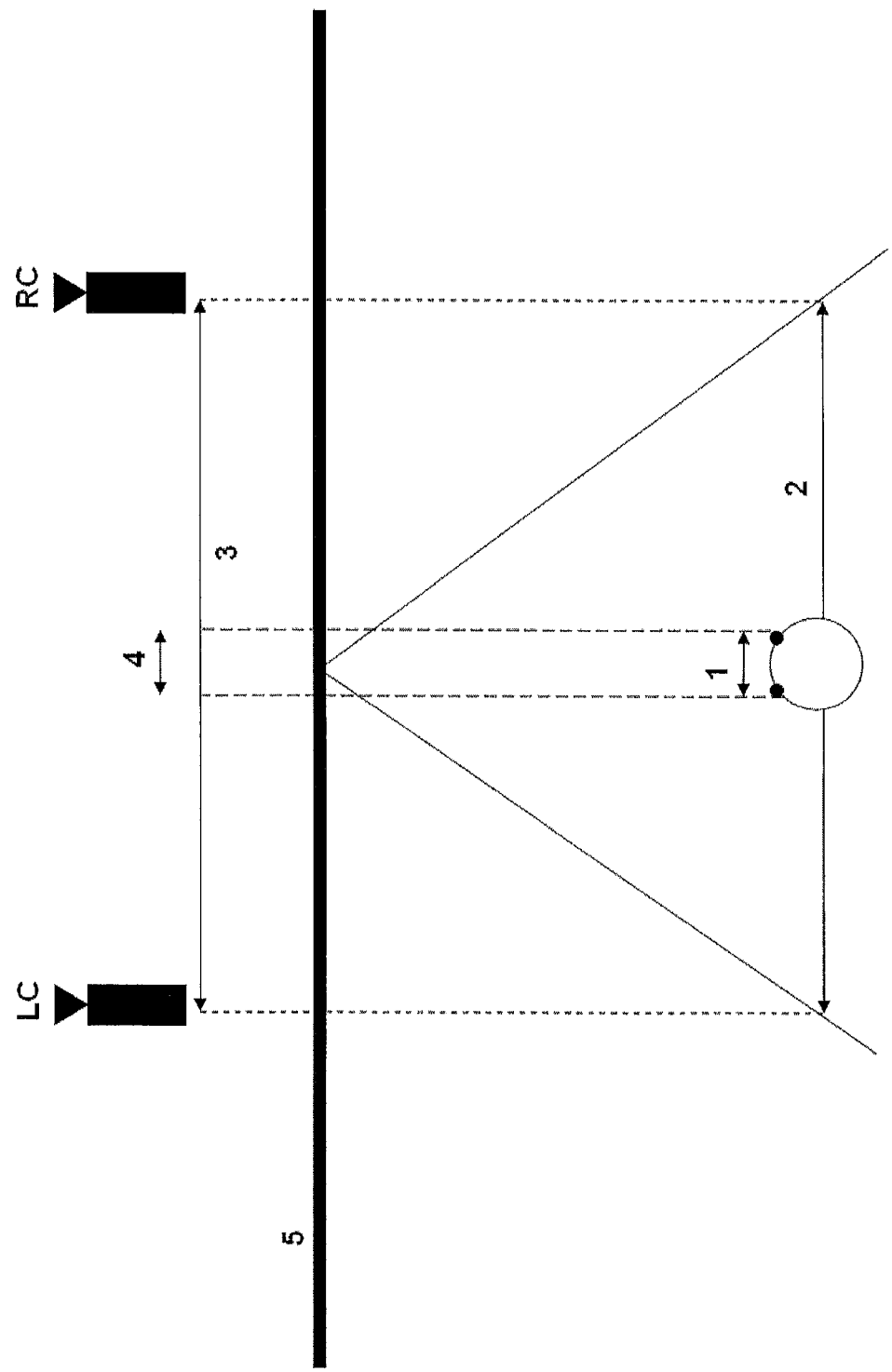
FIG. 1: Implementation of the stereo base of stereo camera within a viewing zone of commonly known multi-viewer display devices.
  LC: Left camera perspective
  RC: Right camera perspective
  1: Eye distance of the viewer
  2: Width of viewing zone at the position of the viewer
  3: Distance of stereo camera lenses
  4: Perceived eye distance
  5: Display device

AE: Extended distance of two lenses generated from the fed distance of the two lenses of a stereo camera.
AA: Eye distance of the observer.
AB: Distance of the perspectives, which will be projected by the display device to the left and right eye of the observer; "perceived eye distance"; perceived stereo base.
SZ: Width of the viewing zone; viewing zone width.
KA: Distance of the lenses of a stereo camera, captured stereo base width.
N: Number of fed camera perspectives.
M: Number of generated extension perspectives.
DU: Lower limit of the disparity presented on the display device which should not be undershot for optimal depth perception.
DO: Upper limit of the disparity presented on the display device which should not be exceeded for optimal depth perception.
F: Extension factor
PE: Percentage extension of the maximum disparity of the fed stereo image.
LC: Leftmost fed camera perspective.
PC: Rightmost fed camera perspective.
LE: Leftmost extension perspective left of LC.
RE: Rightmost extension perspective right of RC.
pLC: Array of pointers of LE pointing to the captured pixels of LC which have to be used.
pRC: Array of pointers of LE pointing to the captured pixels of RC which have to be used.
Wohin: Array of fed or calculated disparities; i-th row of the disparity matrix.
LE_Wohin: Array of calculated extended disparities.
K: Number of rows of the fed stereo image.
Dmax: Maximum disparity in the fed stereo image.
ZW: Number of generated in-between perspectives.
DSTEP: Size of the steps between two in-between perspectives.
NrP: Number of perspectives which have to be displayed.
jll: A specific pixel position in row i.
leftCapture: Index of that perspective where LC has to be displayed.
rightCapture: Index of that perspective where RC has to be displayed.
nrSegments: Number of pixels per perspective step for a given disparity of a pixel jll.
leftBorder: Pixel position at the left border of an occultation.
rightBorder: Pixel position at the right border of an occultation.
Anfang: First pixel position of a row which has to be processed.
Ende: Last pixel position of a row which has to be processed.
LE_Wohin_leftBorder: Disparity at the leftBorder position if it were extended to the maximum right stereo base extension RE.
LE_Wohin_rightBorder: Disparity at the rightBorder position if it were extended to the maximum right stereo base extension RE.

DETAILED DESCRIPTION

Hereinafter the steps of the method of this application are described in greater detail.

To simplify the description, but without restricting generality, the following assumptions are made:
1. The number N of fed camera perspectives is 2. If it is larger, some of the fed camera perspectives are used as in-between perspectives.
2. The fed stereo image is in stereo normal form such that all computations can be done line by line. If this is not the case, a rectification is done prior to processing, or an indexation along the epipolar lines is done.
3. In addition to the fed stereo image a disparity map will be available. It either is fed or has been generated during a preprocessing step. Wohin identifies the i-th line of this disparity map.
4. Whenever in the following a viewing zone is mentioned, this always refers to all viewing zones at the same time and in parallel.

As mentioned above, the objective of the method described here is to perform an extension of the used stereo base KA of a stereo camera based on a fed stereo image with at least N>=2 camera perspectives in order to accomplish a better depth impression on a multi-viewer display device within the viewing zones defined by the optical element of this device. For all autostereoscopic multi-viewer display devices the optical element of the system will cause the left fed camera perspective within each viewing zone to be perceived at the left border of the viewing zone and the right camera perspective to be perceived at the right border of the viewing zone. This is the case at all locations in front of the display device. If the width of the viewing zone SZ is larger than the eye distance AA of the observer, the observer can move freely within the viewing zone. Therefore, a maximum width of the viewing zone SZ would be desirable.

Depending on the eye distance AA of the observer, two different in-between perspectives are always projected to his left and right eye (FIG. 1). The depth impression perceived by the observer depends on the distance of the two projected perspectives (element 4 in FIG. 1). If they are far apart the observer has a strong depth impression. If the distance is small, the depth impression is poor. In the extreme case where the distance of the perspectives is equal to 0 the observer sees only a 2D image. If the distance of the perspectives is at the maximum, meaning the left eye sees the left camera perspective and the right eye sees the right perspective, the depth impression is at a maximum, like for example with all 3D glasses-based displays.

Therefore, the goal for a given viewing zone width SZ and given eye distance AA is for the two projected perspectives to be as far away from each other as possible.

Figure 2:
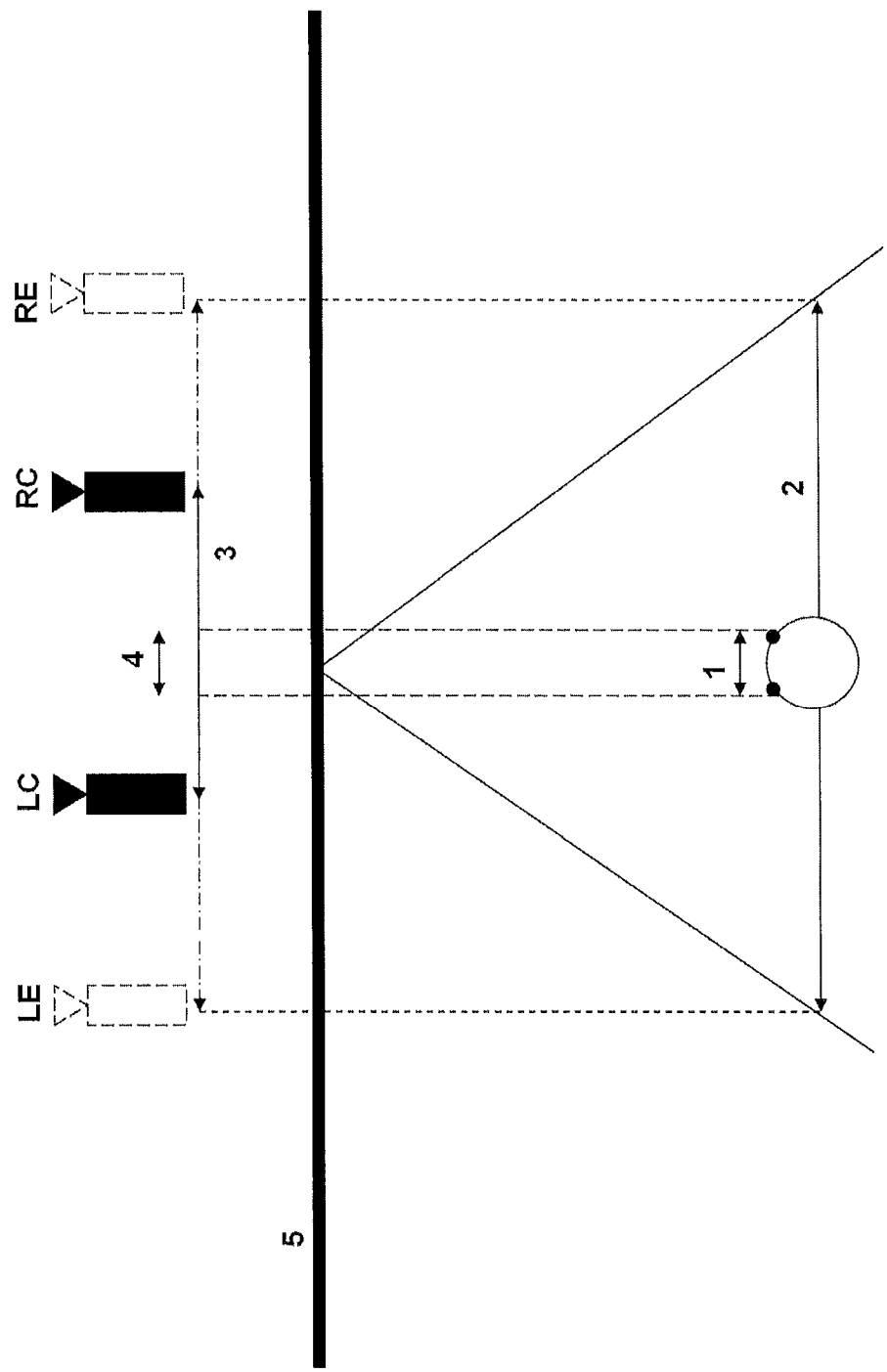
FIG. 2: Implementation of the extended stereo base of stereo camera within a viewing zone by stereo base extension.
  LC: Left real camera perspective
  RC: Right real camera perspective
  LE: Left synthetic camera perspective
  RE: Right synthetic camera perspective
  1: Eye distance of the viewer
  2: Width of viewing zone at the position of the viewer
  3: Distance of real stereo camera lenses
  4: Perceived eye distance
  5: Display device

According to this disclosure this is achieved by synthesizing two virtual extension perspectives LE and RE, which in the viewing direction of the stereo camera left and right of the fed camera perspectives LC and RC are projected to the left and right border of the viewing zone (FIG. 2). According to FIG. 2 these extension perspectives LE and RE are located on the extension line of the stereo base 3 of the left and right camera perspective LC and RC. If the distance between the two perspectives, which for any arbitrary position within a viewing zone are projected to the left and right eye respectively, is referred to as AB, then this "perceived eye distance" AB is computed as $$AB = AA * KA/SZ. \quad (1)$$

For a realistic example with KA=65 mm, SZ=300 mm and AA=63 mm, the perceived eye distance AB is computed as 13.7 mm.

However, if the stereo base is extended as described later by for example PE=200% this results in an extension of 100% for the left extension perspective LE, meaning 65 mm to the left and for the right extension perspective RE an extension of 100% as well, meaning 65 mm to the right on the stereo base 3. This case results in $$AB = 63*(3*65)/300 = 40.9 \text{ mm}. \quad (2)$$

In this example the perceived depth impression is almost identical to the real depth impression of 65 mm.

If the extension factor, by which the captured stereo base KA is extended, is referred to as F then (1) can be generalized as $$AB = F*AA*KA/SZ. \quad (3)$$

This results in $$F = AB*SZ/(KA*AA), \quad (4)$$

if one wants for a given eye distance AA, a given viewing zone width SZ and a captured stereo base width KA to compute the extension factor F depending on the desired perceived stereo base width AB.

If one wants to generate a realistic depth impression, meaning AB=AA, it follows from the above $$F = SZ/KA. \quad (5)$$

In general the distance KA of the camera lenses cannot be influenced. There is a high probability that it is about 65 mm. Therefore, in practice an extension factor F of $$F = 0.0154*SZ \quad (6)$$

can be assumed. For a given viewing zone width SZ=600 mm this results in an extension factor F=9.2. With $$F = 1 + PE/100 \quad (7)$$

this results in a percentage extension PE of about 400%, meaning 260 mm to the left and right each.

Figure 3:
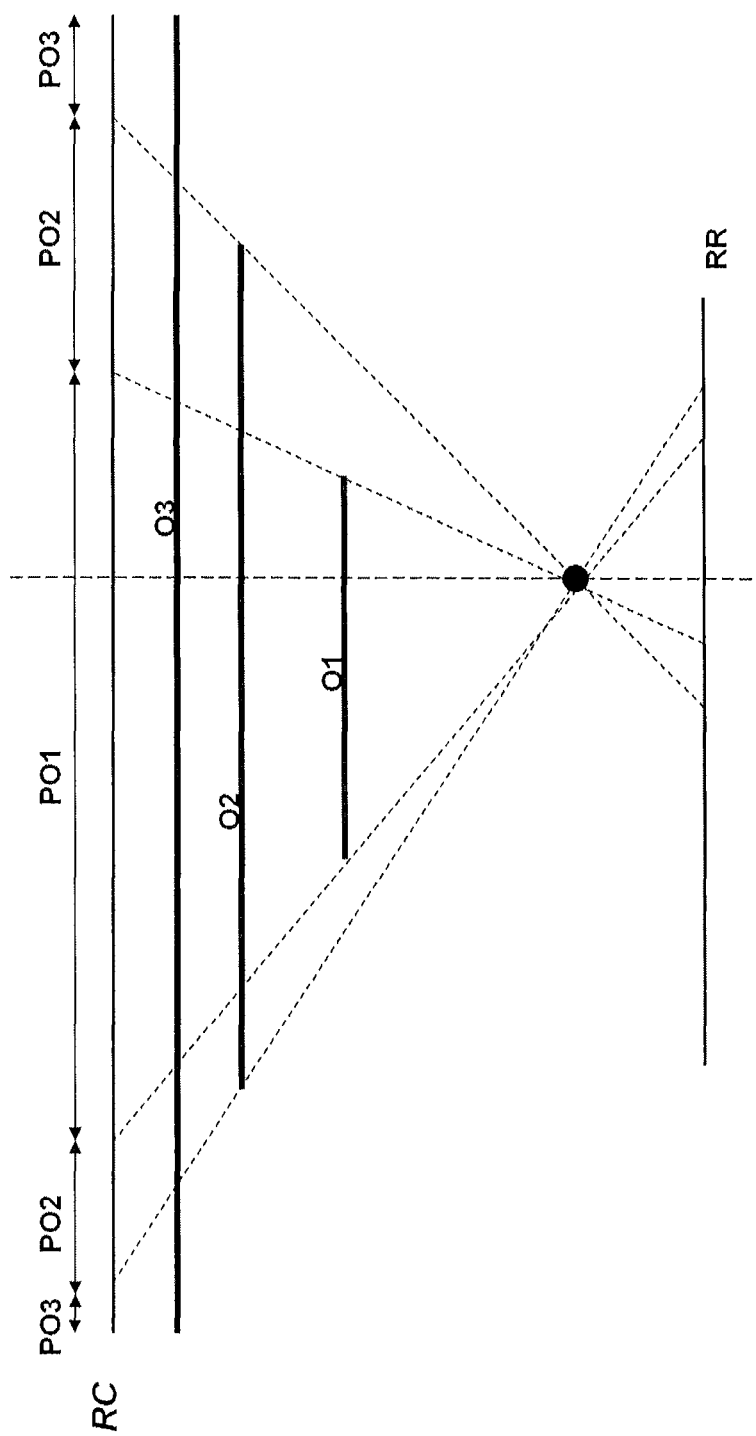
FIG. 3: Scene with 3 objects captured by the right lens of a stereo camera
  RR: Right retina
  O1: Object 1
  O2: Object 2
  O3: Object 3
  PO1: Projections of the object segments of O1
  PO2: Projections of the object segments of O2
  PO3: Projections of the object segments of O3
Figure 4:
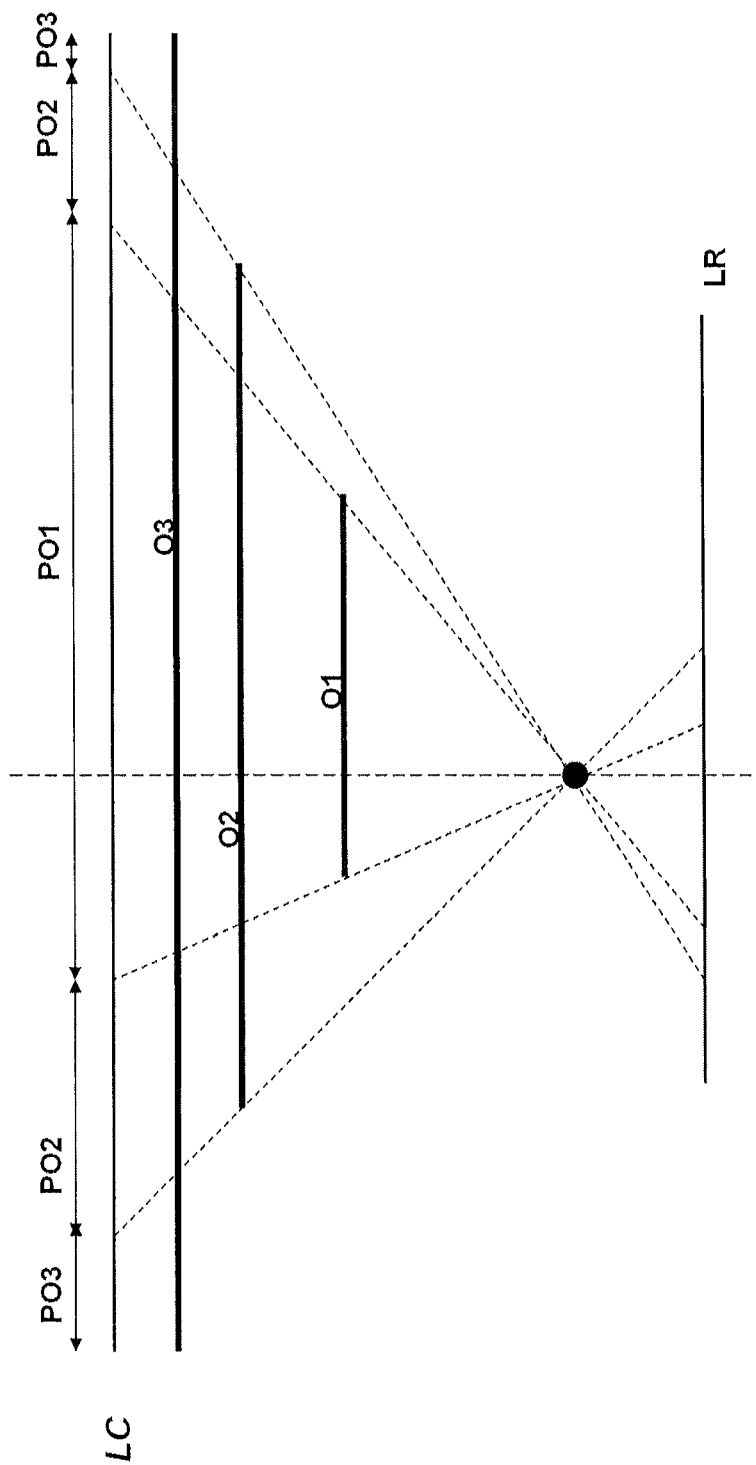
FIG. 4: Same scene as FIG. 3 captured by the left lens of a stereo camera
  RR: Left retina
  O1: Object 1
  O2: Object 2
  O3: Object 3
  PO1: Projections of the object segments of O1
  PO2: Projections of the object segments of O2
  PO3: Projections of the object segments of O3

In a first embodiment it will be described how a stereo base extension based on a fed disparity map can be performed. For this purpose a scene with three objects O1, O2 and O3 is exemplified in FIGS. 3 and 4. In the lower part of each drawing the projection onto the retina of the right (FIG. 3) and left (FIG. 4) eye of the observer, or onto the camera lenses respectively, is illustrated. Here, one single row i of a right (FIG. 3) and left (FIG. 4) eye is illustrated. In the upper part the projection is illustrated after enlargement and mirroring, both the way it is stored in a digital camera and how it is fed into the method described here, respectively.

Figure 5:
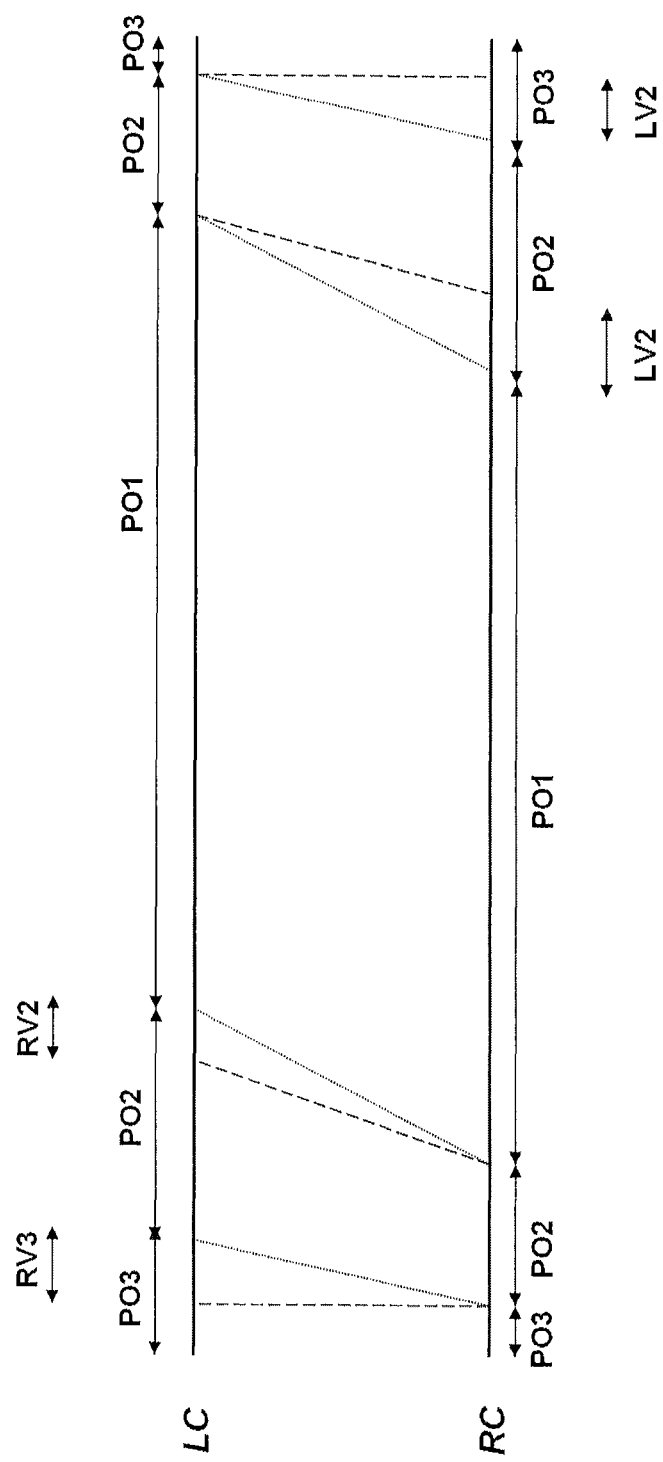
FIG. 5: Visualization of the disparities of the left image LC of FIG. 4 and the right image RC of FIG. 3
  LC: Left camera perspective
  RC: Right camera perspective
  PO1: Projections of the object segments of O1
  PO2: Projections of the object segments of O2
  PO3: Projections of the object segments of O3
  RV2: Right occlusions of object 2
  RV3: Right occlusions of object 3
  LV2: Left occlusions of object 2
  LV3: Left occlusions of object 3

In FIG. 5 the associated disparity is illustrated by the corresponding connecting lines. There, it also shows the right occlusion areas RV2 and RV3 of the objects O2 and O3.

Figure 6:
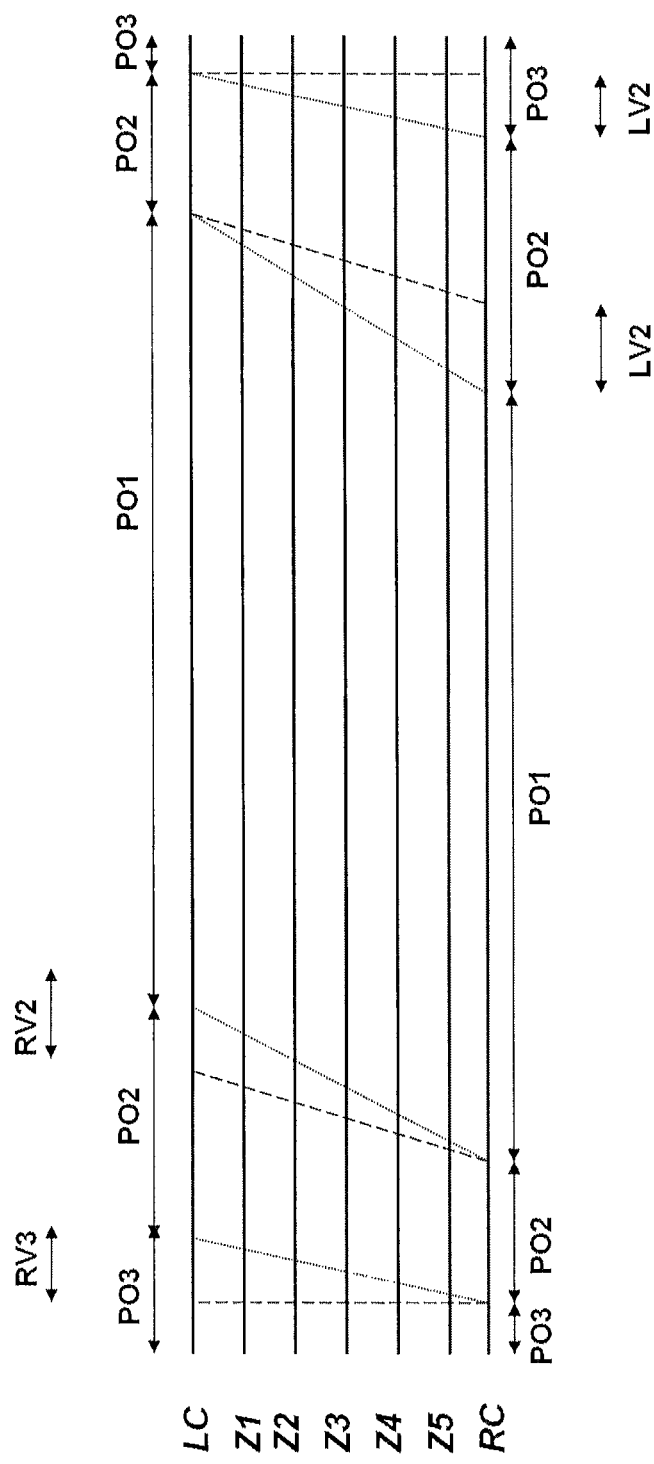
FIG. 6: Visualization of the disparities of FIG. 5 and their mapping to different in-between perspectives
  LC: Left camera perspective
  RC: Right camera perspective
  Z1: In-between perspective 1
  Z2: In-between perspective 2
  Z3: In-between perspective 3
  Z4: In-between perspective 4
  Z5: In-between perspective 5
  PO1: Projections of the object segments of O1
  PO2: Projections of the object segments of O2
  PO3: Projections of the object segments of O3
  RV2: Right occlusions of object 2
  RV3: Right occlusions of object 3
  LV2: Left occlusions of object 2
  LV3: Left occlusions of object 3

On a virtual camera ride from LC to RC, the in-between perspectives are generated in such a way that for corresponding pixels the disparity is subdivided into equidistant segments (FIG. 6). For a virtual camera ride from RC to LC the same holds of course.

By definition of a disparity map the array, Wohin specifies for each pixel jll of the left camera perspective LC with which pixel Wohin(jll) in the right camera perspective RC it corresponds.

Figure 7:
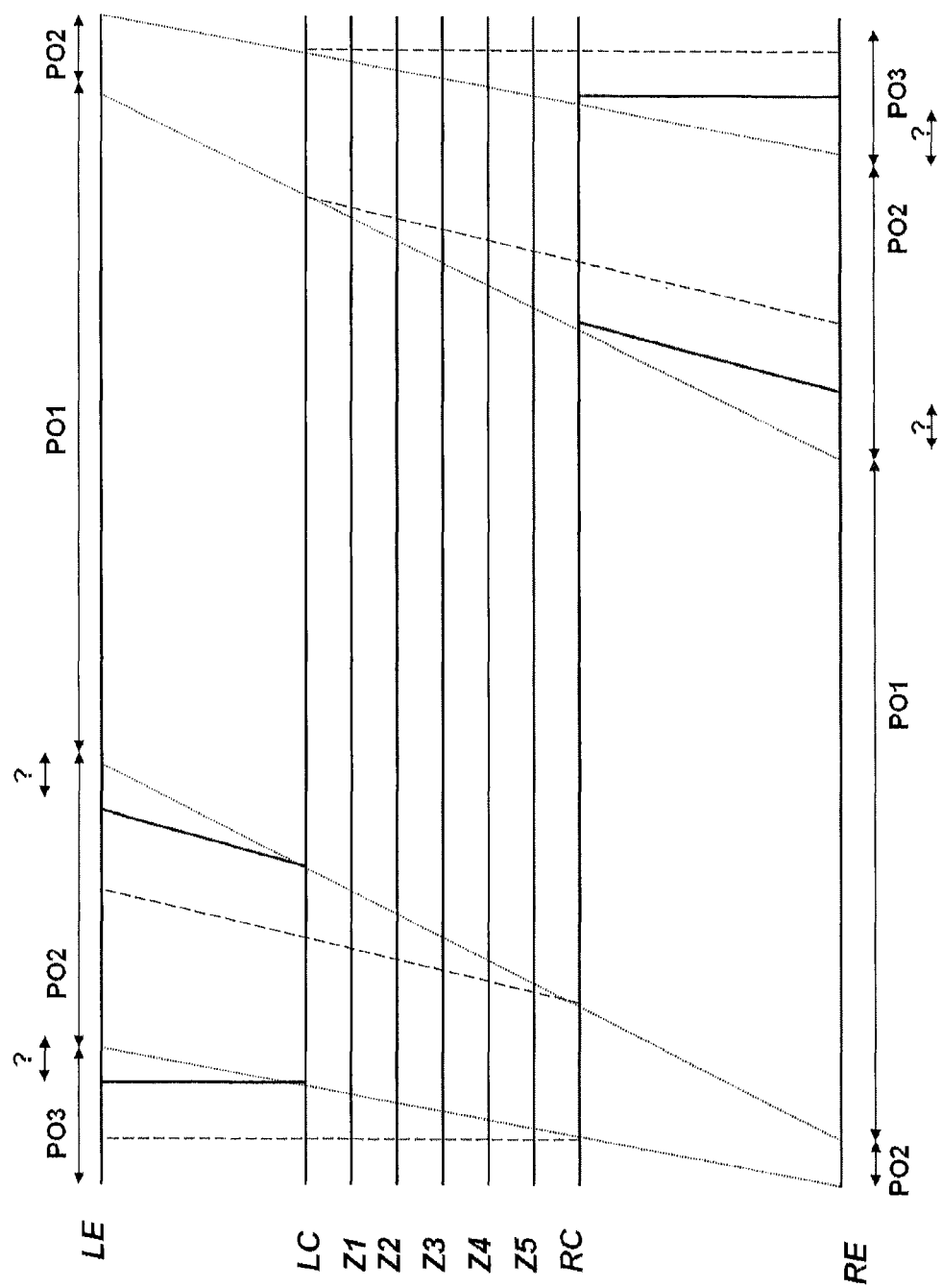
FIG. 7: Execution of the stereo base extension of FIG. 5
  LC: Left camera perspective
  RC: Right camera perspective
  Z1: In-between perspective 1
  Z2: In-between perspective 2
  Z3: In-between perspective 3
  Z4: In-between perspective 4
  Z5: In-between perspective 5
  LE: Left extension perspective
  RE: Right extension perspective
  PO1: Projections of the object segments of O1
  PO2: Projections of the object segments of O2
  PO3: Projections of the object segments of O3
  ?: New left and right occlusions, which have to be interpolated

Now to perform a stereo base extension, the correspondence lines shown in FIG. 5 can be imagined as being extended beyond LC and RC. This results in a linear extension of the stereo base KA beyond LC and RC (FIG. 7). Such an approach is valid, as generation of the in-between perspectives between LC and RC corresponds to a linear camera ride between LC and RC. The virtual camera ride would be continued beyond LC and RC to a certain extent.

But in this case certain problems will arise, for which a solution has to be found:
1. Computation of the new perspective positions for LC and RC within a viewing zone
2. Computation of the pixels of LE and RE
3. Determination of which disparities have to be extended in the extension in case of collision
4. A method for interpolation of the image regions which will become visible through extension of the stereo base.

1. Computation of the New Perspective Positions for LC and RC Within a Viewing Zone If NrP perspectives have to be displayed, the currently existing display devices use LC for perspective 0 and RC for perspective NrP−1.

This does not happen for a stereo base extension, and is generalized in the following way:

LeftCapture being the number of the perspective where LC has to be displayed, this means:

$$\text{LeftCapture}:=(\text{NrP}-1)*(1-1/F)/2 \text{ and} \quad (8)$$

$$\text{RightCapture}:=\text{leftCapture}+(\text{NrP}-1)/F. \quad (9)$$

If the percentage extension PE=0% holds, then F=1 and LeftCapture=0, as well as RightCapture=NrP−1. Therefore, this generalization is backwards-compatible with the currently used approach.

On the other hand, if for example PE=200% is chosen, the stereo base would be extended to left and to the right by 100% each, meaning LC and RC would be shifted by ⅓ inwards. The equations (8) and (9) in this case will result in leftcapture=1/3*(NrP−1) and rightCapture=2/3*(NrP−1), which exactly satisfies our expectations.

2. Computation of the Pixels of LE and RE

If the left perspective is to be displayed at the position jll, the pixel LC(jll) is accessed, according to prior practice. If the corresponding pixel of the right perspective has to be displayed, the pixel RC(Wohin(jll)) is accessed.

This will not work for a stereo base extension, as LEWD and RE(Wohin(jll)) are undefined. Therefore, an array pLC is introduced, in which the position of the pixel of LC is stored which will be accessed from LE if the left perspective is to be displayed. Similarly, an array pRC will be introduced in which the position of the pixel of RC is stored which will be accessed from LE, depending on the disparity there, if the right perspective is to be displayed.

When starting the procedure $$\text{pLC}(jll):=jll \text{ and} \quad (10)$$

$$\text{pRC}(jll):=\text{Wohin}(jll) \quad$$

are set.

If now at a certain position jll a pixel of LE or RE is needed, one has $$\text{LE}(jll):=\text{LC}(\text{pLC}(jll)) \text{ and} \quad (11)$$

$$\text{RE}(\text{Wohin}(jll)):=\text{RC}(\text{pRC}(jll)). \quad (12)$$

Figure 8:
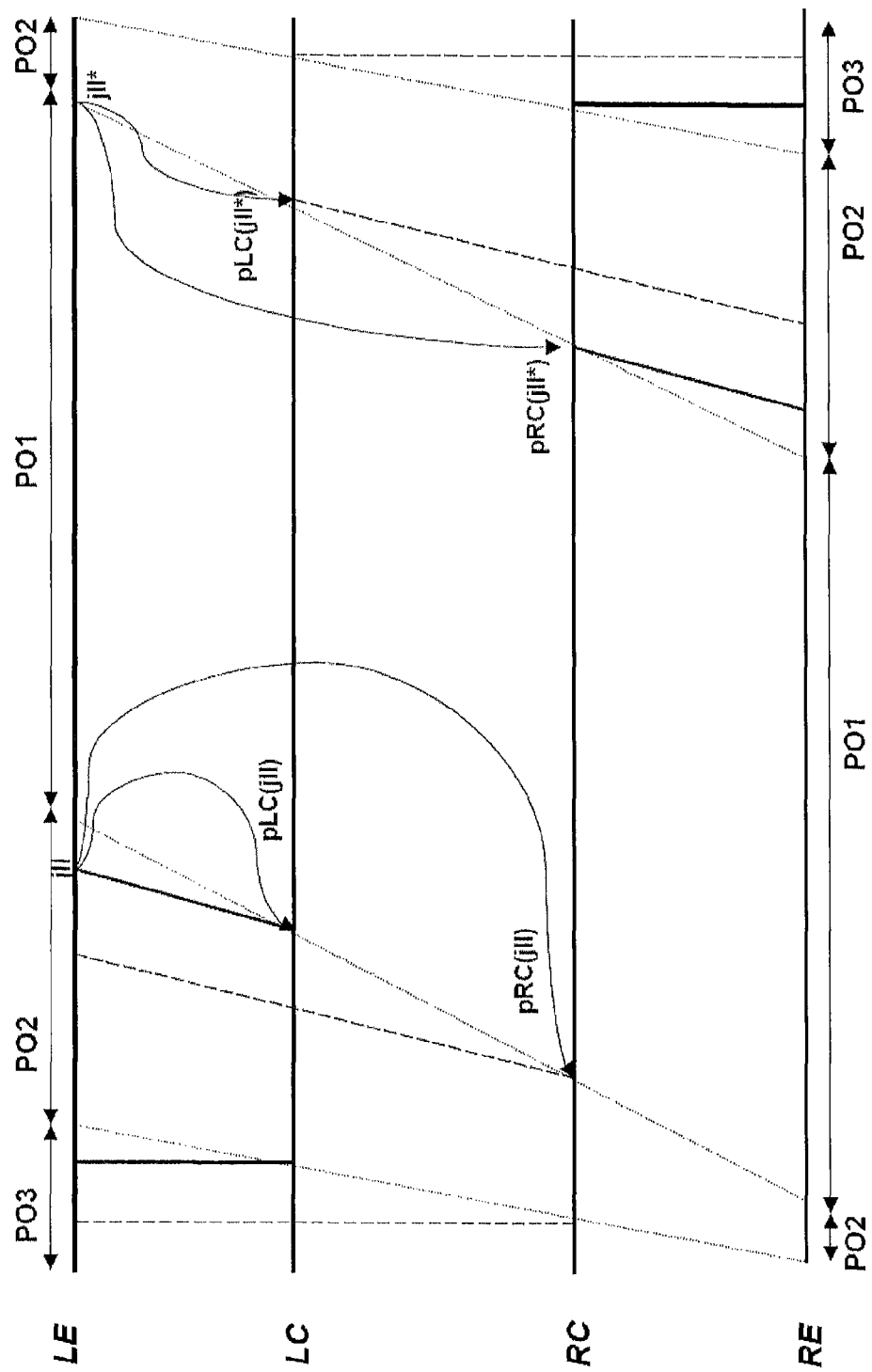
FIG. 8: Visualization of examples of the pointers pLC and pRC
  LC: Left camera perspective
  RC: Right camera perspective
  LE: Left extension perspective
  RE: Right extension perspective
  PO1: Projections of the object segments of O1
  PO2: Projections of the object segments of O2
  PO3: Projections of the object segments of O3
  pLC(jll): Pointer at the position jll of the extension perspective LE pointing to the position in the captured camera perspective LC
  pRC(jll): Pointer at the position jll of the extension perspective LE pointing to the position in the captured camera perspective RC
  pLC(jll*): Pointer at the position jll* of the extension perspective LE pointing to the position in the captured camera perspective LC
  pRC(jll*): Pointer at the position jll* of the extension perspective LE pointing to the position in the captured camera perspective RC

(see FIG. 8) Thus the procedure described here is backwards-compatible with the old procedure in case of a percentage extension of PE=0%.

3. Determination of Which Disparities Have to be Extended in the Extension in Case of a Collision In case of left and right occultations, collisions can occur however at the boundaries of these occultation regions due to the extended disparities overlapping in the extension at the boundaries of these regions. Examples for this case are presented in FIG. 10 for left occultations and FIG. 11 for right occultations. At the end of the day, the question has to be answered of which object is in the foreground. Its disparity will be extended, while the disparity of the other object will result in a new occultation or an extension of an existing occultation, respectively.

The answer is given by the fact that in case of a stereo normal form, as assumed, the disparity is reverse-proportional to the distance of the object to the stereo camera. Objects with a greater disparity are in the foreground in front of other objects as they are closer to the stereo camera and occlude the other object.

Figure 10:
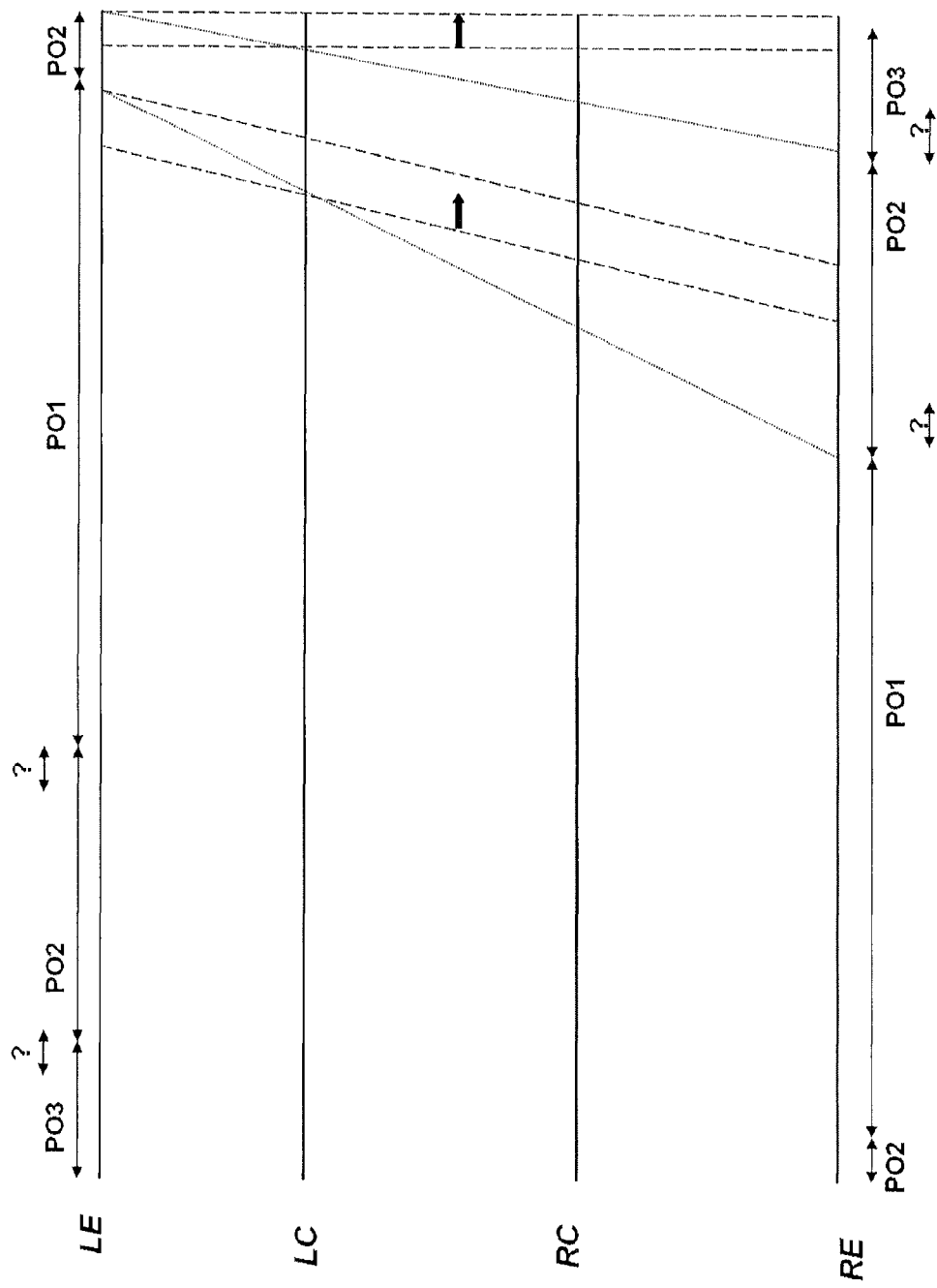
FIG. 10: Possible left occlusions and their treatment
LC: Left camera perspective
RC: Right camera perspective
LE: Left extension perspective
RE: Right extension perspective
PO1: Projections of the object segments of O1
PO2: Projections of the object segments of O2
PO3: Projections of the object segments of O3
?: New left and right occlusions, which have to be interpolated
Figure 11:
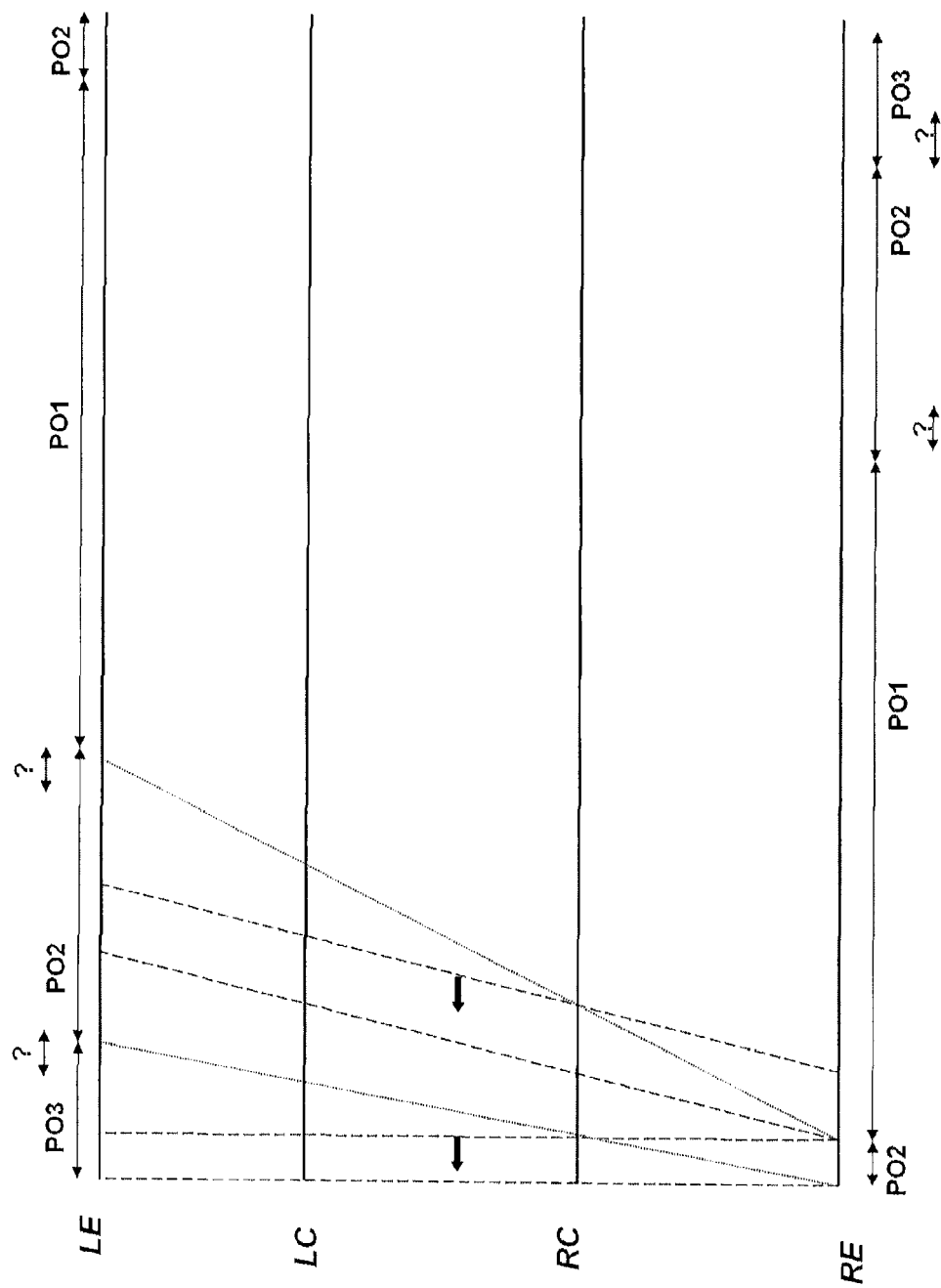
FIG. 11: Possible right occlusions and their treatment
LC: Left camera perspective
RC: Right camera perspective
LE: Left extension perspective
RE: Right extension perspective
PO1: Projections of the object segments of O1
PO2: Projections of the object segments of O2
PO3: Projections of the object segments of O3
?: New left and right occlusions, which have to be interpolated

Thus in case of a collision, if one checks the disparities at the boundaries of the region, the pixels with greater disparity are continued, while the other pixels lead to an occultation (see FIG. 10 and FIG. 11).

4. Method for Interpolation of the Image Regions Which Become Visible Through Extension of the Stereo Base.

By extending the stereo base to the left and right, regions become visible for which no image information exists, because until now these have been occluded. It is possible to look more behind objects in the foreground, like for example object O3 and O3 in FIG. 4. In FIG. 7 such regions are marked with "?".

In the patent specification presented here, the approach is taken to replicate the last visible pixel.

For left occlusions, the left-most pixel of the adjacent left occlusion is repeated. For right occlusions the right-most pixel of the adjacent right occlusion is repeated. A general smoothing procedure over neighboring pixels does not take place, as this would lead to a blurring of the objects' edges, which would reduce the 3D impression.

In general it has to be taken into account that the inaccuracy associated with this is not as great as might be expected, as only those pixels have to be interpolated which actually have to be presented on the display. Studies with HD resolved stereo images show that even for complex scenes and a percentage stereo base extension PE of 500%, the percentage of interpolated pixels is in the range of less than 4%. For simple scenes, the percentage of interpolated pixels is generally less than 2%. On the other hand, the improvement in perceived depth impression is impressive compared to the stereo images presented heretofore.

Figure 15:
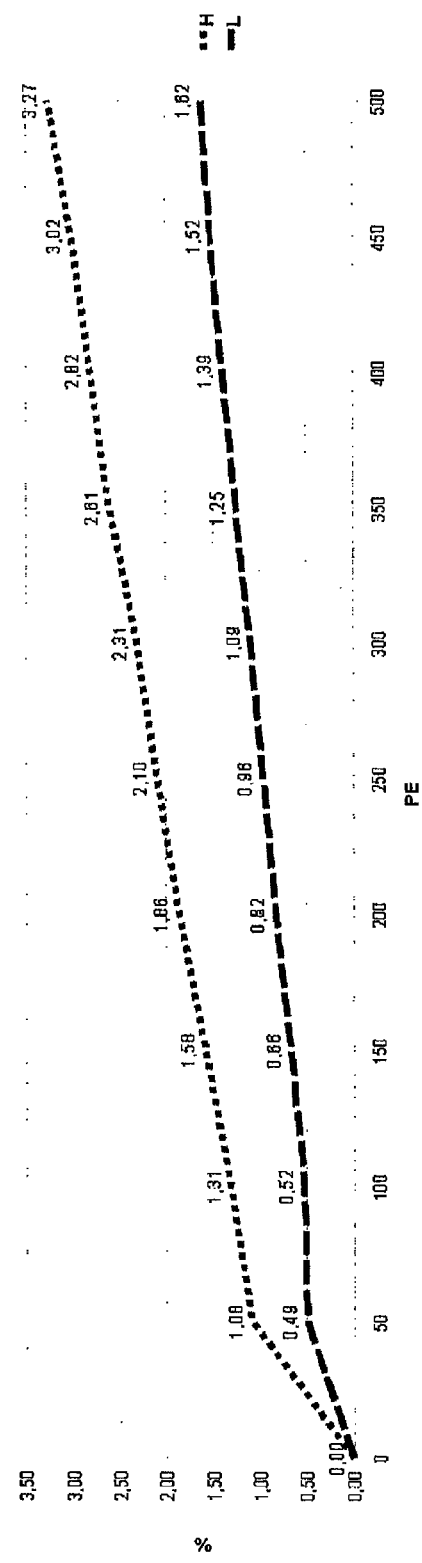
FIG. 15: Statistic of the percentage of pixels which have to be interpolated, depending on the percentage extension and complexity of the analyzed scene
PE: Percentage extension in %
%: Percentage of pixels of an HD stereo image which have to be interpolated
H: Scene with high complexity
L: Scene with low complexity

FIG. 15 shows the evolution of the number of interpolated pixels as a % of the number of total pixels for scenes with high complexity (H) and scenes with low complexity (L) in case of a percentage stereo base extension in the range from 0% to 500%.

Herewith we have identified the solutions for all the above-mentioned problems.

Figure 12:
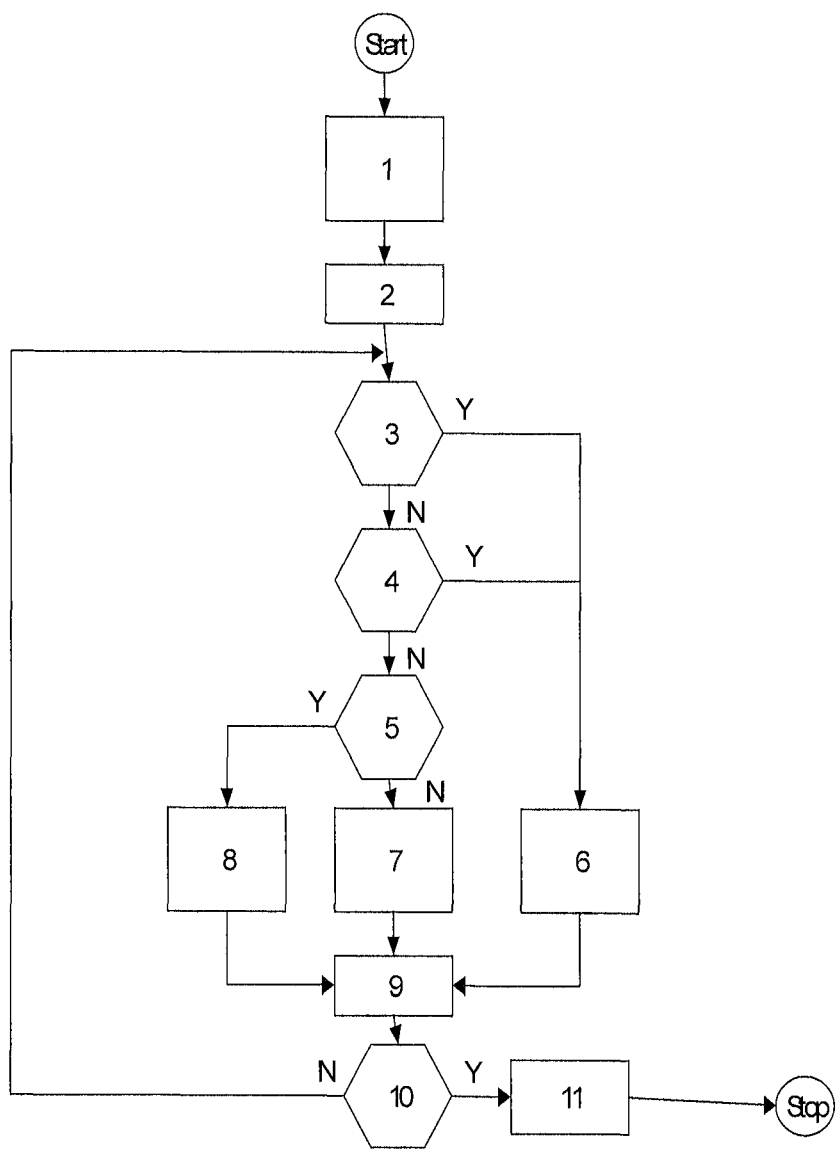
FIG. 12: General flowchart
1: LE_Wohin, initialize pLC and pRC
2: jll: =Start
3: Wohin(jll)=−1?
Y: Yes
N: No
4: Wohin(jll)−Wohin(jll−1)=0?
5: Wohin(jll)−Wohin(jll−1)|>1?
6: Processing right occultation
7: Process extension directly
8: Processing left occultation
9: jll=jll+1
10: jll>Stop?
11: Copy LE_Wohin to Wohin

FIG. 12 shows the frame work as a flowchart for the approach forming the basis of this patent specification. It shows the following procedure:

First the array LE_Wohin is initialized with −2, and the pLC and pRC initialized as previously described.

Then the loop variable jll, which will run over all pixels of a row, is set to the starting value Anfang.

With the query Wohin(jll)=−1 it is checked whether there is a right occultation at jll. If the answer is "yes", it is continued with "Processing right occultation". If "no", it is checked with Wohin(jll)−Wohin(jll−1)=0 whether it will result in a new right occultation in the extension. If this answer is "yes" it is continued with "Processing right occultation". If "no", it is checked whether $$|\text{Wohin}(jll)-\text{Wohin}(jll-1)|>1 \quad (15)$$

holds.

If this is the case, it is continued with "Processing left occultation". If this is not the case, it is continued with "Process extension directly". In all three cases jll=jll+1 will be incremented afterwards, and it is checked whether jll>Ende holds. Now all right and left occultations are identified, and can be preserved and completed with optically correctness in the sub-flowcharts "Processing right occultation" and "Processing left occultation".

If this is the case, LE_Wohin can be copied to Wohin. Afterwards the selected method for image synthesis can be applied based on the newly set disparities, but using the new pointers pLC and pRC.

Figure 13:
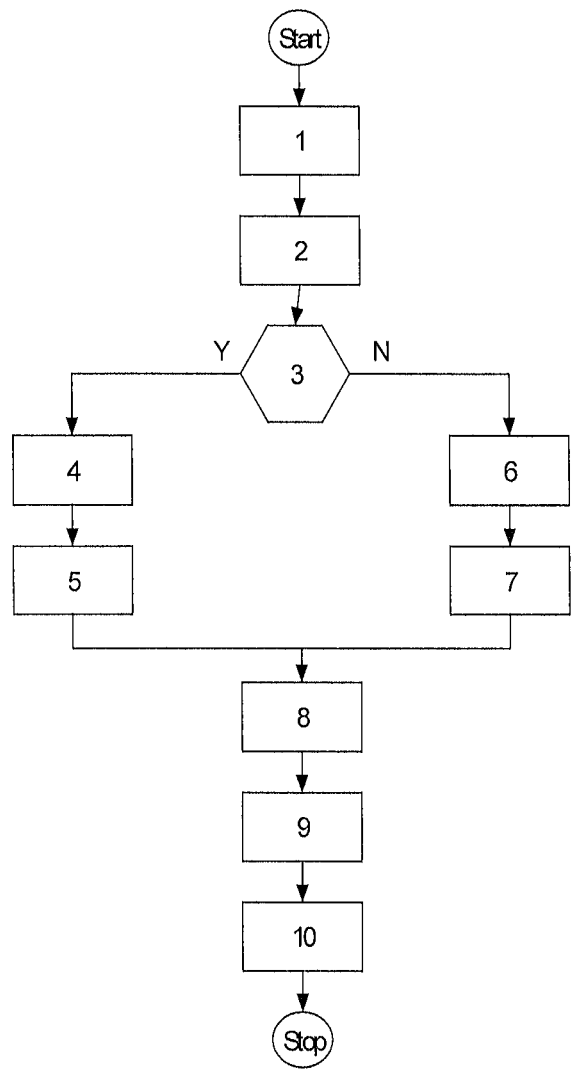
FIG. 13: Flowchart of "Processing right occultation"
1: Calculate disparity at the left border
2: Calculate disparity at the right border
3: Left border in front?
Y: Yes
N: No
4: Calculate extension at the left border
5: Go to the right and calculate extension at the right border
6: Calculate extension at the right border
7: Go to the left and calculate extension at the left border
8: Set left boundary
9: Set right boundary
10: Fill LE_Wohin from the left to jll with −1

In the following the step "Processing right occultation" is described in more detail. It is outlined in FIG. 13 as a flowchart. If Wohin(jll)=−1 or Wohin(jll)−Wohin(jll−1)=0 has been identified first the disparity at the left border of the region is detected. The left border is that pixel index leftBorder for which Wohin(leftBorder)>0 in case of Wohin(jll)=−1, or it is leftBorder=jll−1 if Wohin(jll) and Wohin(jll−1) are pointing to the same pixel in the right camera perspective RC.

The same is performed at the right border with rightBorder=jll, or if Wohin(rightBorder)>0 holds for the first time.

After that it is checked whether the disparity at the left border leftBorder is greater than at the right border right-Border. If this is the case, meaning $$\text{disparity(leftBorder)} > \text{disparity(rightBorder)}, \tag{16}$$

the object at the left border is in the foreground. For this purpose the disparity at leftBorder is extended to the maximum right stereo base extension RE. This results in a value LE_Wohin_leftBorder. A value LE_Wohin_rightBorder is computed in a similar way. Now rightBorder is incremented until LE_Wohin_leftBorder<=LE_Wohin_rightBorder holds. At that position the right occultation is also completed in the extension.

But if (16) does not hold, the object at the right border is in the foreground. In this case similar as stated above, first the disparity at rightBorder is extended to the maximum right stereo base extension RE. Here too, LE_Wohin_rightBorder will be the result.

Now LE_Wohin_leftBorder is re-computed. For this purpose leftBorder is decremented until $$\text{LE\_Wohin\_leftBorder} <= \text{LE\_Wohin\_rightBorder} \tag{17}$$

also holds. At this position the right occultation is also completed in the extension.

After leftBorder and rightBorder have been identified, the continuations of leftBorder and rightBorder to LE are evaluated to the left. For this purpose, first $$\text{LeftStep} := (\text{Wohin(leftBorder)} - \text{leftBorder})/\text{NrSegments} \tag{18}$$

is computed and then $$\text{LeftExtension} = \text{leftBorder} - \text{leftCapture} * \text{leftStep}. \tag{19}$$

Now $$\text{pLC(leftExtension)} = \text{leftBorder},$$

$$\text{pRC(leftExtension)} = \text{Wohin(leftBorder) and}$$

$$\text{LE\_Wohin(leftExtension)} = \text{Wohin(leftBorder)} + (\text{NrP} - \text{rightCapture} - 1)/\text{leftStep} \tag{20}$$

can be set.

In a similar way, rightStep, rightExtension, as well as pLC(rightExtension), pRC(rightExtension) and LE_Wohin (rightExtension) follow from rightBorder. Experienced experts will be familiar with these steps.

Finally LE_Wohin is set to −1 from leftExtension to rightExtension in order to mark the right occultations of LE_Wohin consistently. Here, a value of −1 in LE_Wohin indicates the pixel of an existing right occultation, and a value of −2 indicates a newly revealed pixel which has to be interpolated. FIG. 11 shows various scenarios and their treatment according to the procedure described above.

A new right occultation does not require a different procedure than described above.

In case of a left occultation one can proceed with "Processing left occultation" as follows:

As described earlier, in this case equation (15) holds. For better understanding, various cases and their handling are referenced in FIG. 10.

In this case the left border leftBorder is automatically set correctly. Here, only rightBorder has to be shifted to the right, meaning incremented until $$\text{LeftExtension} <= \text{rightExtension} \tag{21}$$

holds, where leftExtension and rightExtension are computed with the starting values leftBorder:=jll−1 and rightBorder:=jll. Now pLC(rightExtension), pRC(rightExtension) and LE_Wohin(rightExtension) are computed as follows:

$$\text{pLC(rightExtension)} = \text{rightBorder},$$

$$\text{pRC(rightExtension)} = \text{Wohin(rightBorder) and}$$

$$\text{LE\_Wohin(rightExtension)} = \text{Wohin(rightBorder)} + (\text{NrP} - \text{rightCapture} - 1)/\text{leftStep} \tag{22}$$

Figure 14:
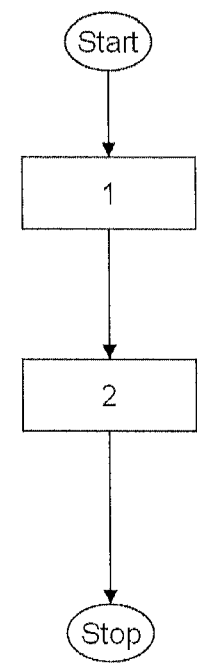
FIG. 14: Flowchart of "Processing left occultation"
1: Search right boundary, for which the extension for the first time is larger than the left boundary, as it was set correctly.
2: Set right boundary

The corresponding flowchart is illustrated in FIG. 14.

Therewith all collision cases of the stereo base extension have been handled optically correctly.

If there is no occultation the disparity between jll and jll−1 does not change.

Therefore one has $$|\text{Wohin(jll)} - \text{Wohin(jll-1)}| = 1. \tag{23}$$

In this case jllExtension can be computed analogously to (19), as $$\text{jllExtension} = \text{jll} - \text{leftCapture} * \text{jllStep} \tag{24}$$

and pLC(jllExtension), pRC(jllExtension) as well as LE_Wohin(jllExtension) result in:

$$\text{pLC(jllExtension)} = \text{jll},$$

$$\text{pRC(jllExtension)} = \text{Wohin(jll) and}$$

$$\text{LE\_Wohin(jllExtension)} = \text{Wohin(jll)} + (\text{NrP} - \text{rightCapture} - 1)/\text{jllStep}, \tag{25}$$

where $$\text{jllStep} = (\text{Wohin(jll)} - \text{jll})/\text{NrSegments} \tag{26}$$

holds.

Figure 9:
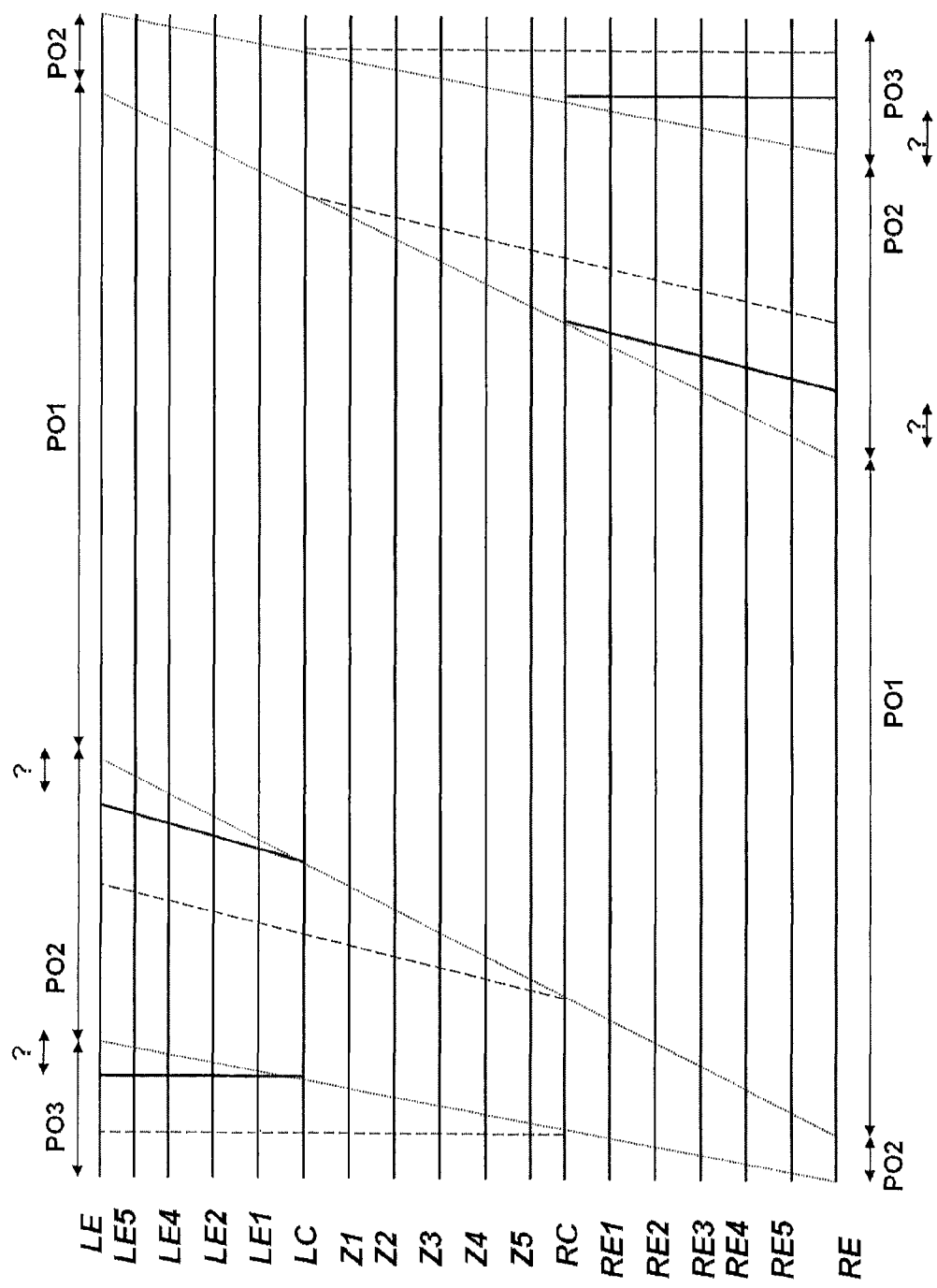
FIG. 9: Synthesis of additional in-between perspectives outside of the stereo base from LC to RC
  LC: Left camera perspective
  RC: Right camera perspective
  Z1: In-between perspective 1
  Z2: In-between perspective 2
  Z3: In-between perspective 3
  Z4: In-between perspective 4
  Z5: In-between perspective 5
  LE: Left extension perspective
  RE: Right extension perspective
  PO1: Projections of the object segments of O1
  PO2: Projections of the object segments of O2
  PO3: Projections of the object segments of O3
  ?: New left and right occlusions, which have to be interpolated
  LE1: Left extension perspective 1
  LE2: Left extension perspective 2
  LE3: Left extension perspective 3
  LE4: Left extension perspective 4

When LE_Wohin has been copied to Wohin the disparity map for the stereo base extension has been created and can be used for the synthesis of all NrP perspectives between LE and RE (FIG. 9).

In a second embodiment, the extension factor F can be interactively changed by an observer using a remote control unit, such that the depth impression can be adapted to the individual perception of the observer.

In a third embodiment, the extension factor F will be automatically computed as follows:

From studies in the past it is well known that the maximum disparity D presented on an autostereoscopic display should not exceed a certain limit, as otherwise the human brain is unable to merge the displayed perspectives into an internal spatial image in a certain region.

This maximum disparity D depends on certain parameters, such as the resolution of the display or optical properties of the optical element used. Therefore, during display design the maximum disparity not to be exceeded can be specified. Lower limits DU and upper limits DO can be defined between which disparity D should range to generate maximum depth impression. The depth impression should always be at a maximum, but never exceed the upper limit DO.

If the maximum disparity Dmax is known from a fed stereo image, the extension factor F can be computed as follows:

$$F := ((DO+DU)/2)/D\text{max} \quad (27)$$

If for a fed stereo image the maximum disparity D is not known, it is detected by a search loop over all disparities in advance. The procedure thereafter is as described above.

In a fourth embodiment it will be outlined how the procedure described above can be integrated in a stereoscopic recording device:

Stereo base extension can be applied for more than the presentation of stereoscopic images and image sequences. It is also possible to extend the stereo base of two closely attached lenses of a stereo camera already during recording. For this it the procedure is that the lenses are synchronized and the disparities are evaluated in realtime in the stereo camera, for example by a dedicated disparity processor. Rectification, i.e. bringing the recording of the stereo camera into stereo normal form, is not necessary, as this can be ensured during camera production by calibrating the lenses. Afterwards the stereo base extension with an extension factor F takes place by using the captured perspectives and the computed disparity map depending on zoom and focus. This ensures that the picture always has an extended stereo base of approximately 65 mm, even if the lenses are only 31 mm apart, for example. Also, objects zoomed-in from a large distance are captured with good depth impression.

If the stereo camera is additionally equipped with a depth sensor, this speeds up the computation of the disparity map significantly. In this case two perspectives and a depth map are used for doing the stereo base extension.

The methods described in this application will be implemented in a device consisting of at least one processing unit which has access to at least one line of the fed stereo image, and at least one storage unit in which the fed stereo image, disparity map, pointers described previously and the lines Wohin and LE_Wohin along with all other variables and parameters can be stored.

Ideally there should be at least 1080 processing units to be able to process all lines of a stereo image with HD resolution in parallel. Also, the storage units can be structured in such a way that for each processing unit there are local storage units and additional global storage units which all processing units can access in parallel.

Finally, the following remarks are provided:
1. The method described herein not only can be applied to single stereo images but also to stereo image sequences.
2. As a display device projection systems as well as monitors can be used.
3. If in the future a larger distance KA of the lenses of a stereo camera is chosen, the degree of freedom won can be used to enlarge the viewing zone SZ. A width of the viewing zone of 2 m=2000 mm is desirable and not unrealistic for a living room. A stereo base extension according to the disclosure presented here will still be valid, because a lens distance of 2 m is very unrealistic in practice.
4. Apart from a stereo base extension along the extension of the connecting line between LC and RC, other shapes can also be selected as well. This could be an arc, for example. In such case, for consistency reasons the synthesized perspectives between LC, RC and the right and left extension perspectives as well as the inner in-between perspectives have to be located on the corresponding circular segment.
5. If instead of a disparity map a depth map is fed to the procedure, it is used in a preprocessing step to compute the disparity map and serves well for improving the quality of this disparity map.
6. After the extended disparity row LE_Wohin has been copied to Wohin, the generation of the synthesized in-between and extension perspectives can also be implemented in such a way that only those pixels of a row are generated which are actually needed for presentation on an autostereoscopic display device. Such a procedure is described for example under [6]. The special characteristic of this procedure is the ability to generate a large, arbitrary number of in-between and extension perspectives. If the method of pseudo-holographic image synthesis is applied, for a known or assumed distance KA of the captured camera perspectives the number of perspectives can be calculated such that the maximum distance between two adjacent perspectives is smaller than any given threshold $\epsilon$. This reduces the risk that the spatial image will collapse due to two adjacent perspectives being too far apart.

REFERENCES

1. Lüscher: "Grundregeln der Stereoskopie", Der Stereoskopiker, Nr. 5, Jan. 15, 1931. Organ der Gesellschaft für Stereokopie e.V.
2. Krah, C.: "Three-dimensional Display System", US/2006/7843449
3. Teik, Oh et al: "3D Image Synthesis from Depth Encoded Source View", US2004/0100464
4. Huang H-C et al: "Generation of Multiviewpoint video from stereoscopic video", IEEE Transactions on Consumer Electronics, NY, US vol. 45, No. 1, February 1999
5. Hendrik E et al: "Real time Synthesis of digital multi viewpoint stereoscopic images", Proceedings of SPIE, SPIE, Bellingham, Va., US, Vol. 3639, January 1999, XP008021883
6. Kamins-Naske, S. et al: "Verfahren and Vorrichtung zur pseudoholographischen Bildsynthese", WO 2007/121970, Nov. 1, 2007
7. Humera Noor: "Virtual Image Generation by View Extrapolation of Real Scenes", MUET Journal, 2008

The invention claimed is:
1. A method for the generation of M greater or equal to 2 synthetic perspectives from a fed stereo image with at least N greater or equal to 2 perspectives such that at least one perspective LE in the viewing direction of the camera is generated left of the left-most fed camera perspective, and at least one perspective RE in the viewing direction of the camera is generated right of the right-most fed camera perspective in such a way that a disparity map Wohin from the left-most fed camera perspective LC to the right-most camera perspective RE is computed;

for each row of the fed camera perspective an array pLC and an array pRC is generated, the content of the arrays being pointers to the pixels of the left-most fed camera perspective LC and the right-most fed camera perspective;

a new disparity map LE_Wohin is computed, where an index jllExtension being computed for each pixel jll of each row and pLC(jllExtension)=jll, pRC(jllExtension)=Wohin(jll) being set; and the synthetic perspectives LE and RE are generated using the disparity map LE_Wohin and the pointers of the arrays pLC and pRC pointing to the pixels of the fed camera perspectives LC and RC;

where both synthetic perspectives are located left and right of the extension of the connecting line between left-most and right-most fed camera perspective LC and RC.

2. The method according to claim 1, wherein given at least one synthetic perspective, at least one pixel of the synthetic perspective(s) which does not have to be displayed on the display device is not generated.

3. The method according to claim 1, wherein for a fed limit $\epsilon$ the number of synthetic perspectives is computed such that the distance between two adjacent perspectives is smaller than the limit s with respect to the distance between the left fed camera perspective LC and the right fed camera perspective RC.

4. The Method according to claim 1, wherein an extension factor F is computed such that the resulting maximum disparity between the pixels of the left-most synthetic and right-most synthetic perspective lies between a fixed lower limit DU and a fixed upper limit DO, with the maximum disparity Dmax being extracted from the disparity map Wohin, and the extension factor F: $=(DO+DU)/2)/Dmax$ is determined.

5. The Method according to claim 1, wherein a disparity map is computed from the fed camera perspectives and a fed depth map.

6. A device for the generation of M greater or equal to 2 synthetic perspectives according to the method of claim 1 comprising at least one processing unit for the computation of the synthetic perspectives, and at least one storage unit in which the fed camera perspectives and synthetic perspectives are stored.

* * * * *